United States Patent
Bast

(10) Patent No.: US 12,214,942 B2
(45) Date of Patent: Feb. 4, 2025

(54) PACKAGE, SPOUT FOR A PACKAGE AND PACKAGE-SPOUT ASSEMBLY

(71) Applicant: TETRA LAVAL HOLDINGS & FINANCE S.A., Pully (CH)

(72) Inventor: Tim Bast, Södra Sandby (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 600 days.

(21) Appl. No.: 17/297,133

(22) PCT Filed: Nov. 7, 2019

(86) PCT No.: PCT/EP2019/080536
§ 371 (c)(1),
(2) Date: May 26, 2021

(87) PCT Pub. No.: WO2020/114707
PCT Pub. Date: Jun. 11, 2020

(65) Prior Publication Data
US 2022/0024637 A1 Jan. 27, 2022

(30) Foreign Application Priority Data
Dec. 3, 2018 (EP) .................... 18209853

(51) Int. Cl.
*B65D 5/74* (2006.01)
*B65D 75/58* (2006.01)
*B65D 85/72* (2006.01)

(52) U.S. Cl.
CPC ......... *B65D 5/748* (2013.01); *B65D 75/5877* (2013.01); *B65D 85/72* (2013.01)

(58) Field of Classification Search
CPC .... B65D 5/748; B65D 75/5877; B65D 85/72; B65D 5/746; B65D 5/741; B65D 5/74;
(Continued)

(56) References Cited

U.S. PATENT DOCUMENTS 3,278,083 A * 10/1966 Serafini ..................... B67B 7/26
222/91
3,768,698 A * 10/1973 Corty, Sr. ................. B67B 7/26
222/91
(Continued)

FOREIGN PATENT DOCUMENTS

CN 2218149 Y 1/1996
CN 101056799 A 10/2007
(Continued)

OTHER PUBLICATIONS

Office Action (The First Office Action) issued Nov. 30, 2022, by the State Intellectual Property Office of People's Republic of China in corresponding Chinese Patent Application No. 201911213483.2 and an English translation of the Office Action. (22 pages).
(Continued)

*Primary Examiner* — Christopher R Demeree
(74) *Attorney, Agent, or Firm* — BUCHANAN INGERSOLL & ROONEY PC

(57) ABSTRACT

There is described a package-spout assembly having a package having a pour opening surface area and a reusable spout. The package comprises a first fastening device being arranged adjacent to the pour opening surface area and the spout comprises a second fastening device. The first fastening device and the second fastening device are configured such to removably and/or releasably couple the spout onto the package.

16 Claims, 4 Drawing Sheets

(58) Field of Classification Search
CPC ...... B65D 41/04; B65D 47/06; B65D 47/122; B65D 41/50; B65D 75/5872; Y02W 30/80; B67B 7/26; B31B 50/84
USPC .... 229/214, 125.15, 125.09, 125.14, 125.04; 222/567, 81, 91, 83, 153.06, 541.5; 220/278, 258.4, 277; 53/133.2, 490, 471
See application file for complete search history.

(56) References Cited

U.S. PATENT DOCUMENTS

| | | | |
|---|---|---|---|
| 4,867,324 | A | 9/1989 | Rogosich et al. |
| 7,066,337 | B2 * | 6/2006 | Hsu .................... B01D 46/0002 215/261 |
| 7,322,492 | B2 * | 1/2008 | Kawaguchi ............. A61J 15/00 229/103.1 |
| 2005/0139565 | A1 | 6/2005 | Cohn |
| 2008/0105640 | A1 | 5/2008 | Ott |
| 2009/0001722 | A1 | 1/2009 | Yoshihiro et al. |
| 2010/0089776 | A1 | 4/2010 | Anthony et al. |
| 2010/0096398 | A1 | 4/2010 | Gorskey et al. |
| 2012/0273996 | A1 | 11/2012 | Martini et al. |
| 2013/0101238 | A1 | 4/2013 | Han |

FOREIGN PATENT DOCUMENTS

| | | | |
|---|---|---|---|
| CN | 101723123 | A | 6/2010 |
| CN | 101818840 | A | 9/2010 |
| CN | 102186735 | A | 9/2011 |
| CN | 102762353 | A | 10/2012 |
| CN | 103253446 | A | 8/2013 |
| CN | 107000902 | A | 8/2017 |
| CN | 212401834 | U | 1/2021 |
| DE | 202005012423.0 | U1 | 1/2006 |
| JP | H01-100783 | U | 7/1989 |
| JP | H02-001675 | U | 1/1990 |
| JP | H02-001676 | U | 1/1990 |
| JP | 2002-031456 | A | 1/2002 |
| JP | 2008-162679 | A | 7/2008 |
| JP | 2012-020773 | A | 2/2012 |
| JP | 2013-119409 | A | 6/2013 |
| JP | 2013-528539 | A | 7/2013 |
| JP | 2013-203464 | A | 10/2013 |
| JP | 2015-098336 | A | 5/2015 |
| WO | 0154991 | A1 | 8/2001 |

OTHER PUBLICATIONS

Office Action (Notice of Reasons for Refusal) issued Jul. 18, 2023, by the Japan Patent Office in corresponding Japanese Patent Application No. 2021-531514 and an English translation of the Office Action. (12 pages).

International Search Report (PCT/ISA/210) and Written Opinion (PCT/ISA/237) mailed on Jan. 22, 2020, by the European Patent Office as the International Searching Authority for International Application No. PCT/EP2019/080536. (9 pages).

European Search Report and Written Opinion issued by European Patent Office on Apr. 8, 2020 in counterpart European Patent Application No. 19207706.3. (6 Pages).

* cited by examiner

PACKAGE, SPOUT FOR A PACKAGE AND PACKAGE-SPOUT ASSEMBLY

TECHNICAL FIELD

The present invention relates to a package, in particular a package filled with a pourable product, even more particular a package filled with a pourable food product.

The present invention also relates to a spout for a package, in particular a spout to be removably coupled to a package filled with a pourable product, even more particular a pourable food product.

The present invention also relates to a blank for forming a package, in particular a package filled with a pourable product, even more particular a package filled with a pourable food product.

BACKGROUND ART

As is known, many liquid or pourable food products, such as fruit juice, UHT (ultra-high-temperature treated) milk, wine, tomato sauce, etc., are sold in packages made of sterilized packaging material.

A typical example is the parallelepiped-shaped package for pourable food products known as Tetra Brik Aseptic (registered trademark), which is made by sealing and folding a laminated strip packaging material. The packaging material has a multilayer structure comprising a carton and/or paper base layer, covered on both sides with layers of heat-seal plastic material, e.g. polyethylene. In the case of aseptic packages for long-storage products, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Some versions of these packages comprise a designated pour opening surface area, which is configured to be pierced by a drinking straw so as to allow the introduction of the drinking straw into the carton package so as to permit the extraction of the pourable food product.

The drinking straw is typically attached to the package within a closed plastic envelop and being attached to the package. Prior to its use a consumer detaches the drinking straw together with its envelop from the package or extracts the drinking straw from the envelop, while the latter remains attached to the package.

A drawback of these packages resides in that the drinking straws are of single use.

A further drawback resides in that for hygienic reasons the drinking straws need to be placed within the respective plastic envelops. In some cases the consumer is inattentive and the plastic envelop becomes dispersed in a non-controlled manner in the environment. In some cases, this also applies to the drinking straw itself.

A need is felt in the sector to improve the known packages. In particular, so as to overcome at least one of the above-mentioned drawbacks.

DISCLOSURE OF INVENTION

It is therefore an object of the present invention to provide in a straightforward and low-cost manner an improved package, in particular an improved carton package.

It is a further object of the present invention to provide in a straightforward and low-cost manner an improved spout for a package, in particular a carton package.

It is a further object of the present invention to provide in a straightforward and low-cost manner an improved package-spout assembly.

According to the present invention, there is provided a package and a spout according to the respective independent claims.

Further advantageous embodiments of the package and the spout are specified in the dependent claims.

BRIEF DESCRIPTION OF THE DRAWINGS

Non-limiting embodiments of the present invention will be described by way of example with reference to the accompanying drawings, in which.

DETAILED DESCRIPTION OF THE EMBODIMENTS

Figure 1:
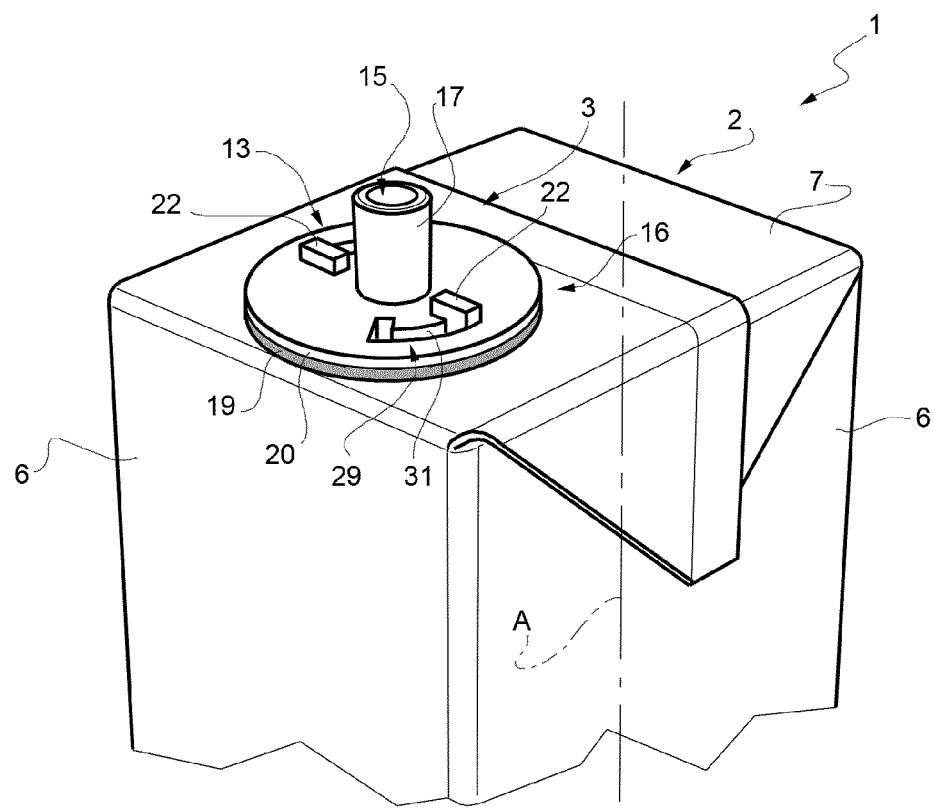
FIG. 1 is a schematic perspective view of a portion of a package-spout assembly having a package and a spout according to the present invention, with parts removed for clarity.

The present invention relates to a package for a pourable product, in particular a pourable food product. The package may be any type of container suitable for storing the pourable product. The package may be sealed prior to use for containing and avoiding spillage of the pourable product.

The package may be sealed by a longitudinal sealing band and two transversal sealing bands when the package is made from a web of packaging material or from a flat blank of packaging material.

The package may physically protect the pourable product from spoilage with pollutants and from contamination with microorganisms such as pathogens.

The package may provide barrier protection against oxygen, water vapor, dust, and other environmental contaminants.

The package has an inner volume in which the pourable product is stored. The package has one or more wall portions, which in combination surround the inner volume. Each wall portion has an inner surface facing the inner volume and an outer surface opposite the inner surface and facing towards the environment.

The package is suitable for packaging a pourable product, in particular a pourable food product. The term "pourable product" as used herein refers to any product that may be poured. The pourable product may be liquid or granular. The pourable product may be a liquid containing particulates in which the particulates will flow with the liquid.

The package comprises a designated pour opening surface area. The term "designated pour opening surface area" refers to any part of any wall portion of the package, which has been intended for at least partial opening so that the pourable product can be emptied from the package.

The designated pour opening surface area may be positioned on any wall portion such as a top wall portion, a front wall portion, a back wall portion, or a side wall portion.

The package may comprise more than one designated pour opening surface.

The packaging material within at least a portion of the designated pour opening surface area may be weaker than the packaging material in other parts of any wall portion. The weakening may be achieved by perforating and/or cutting and/or opening at least a portion of the circumference of the designated pour opening surface area. The weakening may be achieved by omitting at least one layer, such as a fibrous layer, from the packaging material.

The package comprises at least a first fastening device. The term "first fastening device" as used herein refers to any device that is capable of restraining its relative spatial or rotational movement in at least one degree of freedom when engaged with another device such as a second fastening device. Preferably, the fastening device is capable of restraining its relative spatial movement in at least one spatial degree of freedom and/or its relative rotational movement in at least one rotational degree of freedom when engaged with another device such as a second fastening device.

The first fastening device is coupled to an outer surface of at least one wall portion of the package and is positioned adjacent to the designated pour opening surface area, preferably on the same wall portion.

The first fastening device may be coupled to the wall portion through adhesive bonding, ultrasonic bonding, molding or the like.

The first fastening device may be connected to an anchor portion positioned on the inner surface of the wall portion, thereby clamping the first fastening device to the wall portion. The connection may pierce the wall portion and may be manufactured through joint injection molding of the first fastening portion and the anchor portion.

The first fastening device is configured to releasably and/or removably engage with a second fastening device of a reusable spout. The term "releasable and/or removeable engagement" as used herein refers to any engagement between a first fastening device and a second fastening device in which there is a first position in which the fastening devices are engaged with each other and in which there is a second position in which the first fastening device and the second fastening device are not engaged with each other whereby the first fastening device and the second fastening device can be brought at least once from the second into the first position in a non-destructive manner. Preferably, the first fastening device and the second fastening device can be brought back into the second position again, even more preferably in a non-destructive manner. Even more preferably, the first fastening device and the second fastening device can be brought back and forth between the first and the second position multiple times in a non-destructive manner.

The first fastening device is coupled to an outer surface of at least one wall portion of the package adjacent to the designated pour opening surface area. The term adjacent in this context means that the position of the first fastening device is chosen such that, when the first fastening device is engaged with a second fastening device of a spout, the spout may receive the pourable product dispensed from an opening within the designated pour opening surface area. The first fastening device may be positioned relative to the designated pour opening surface area so that it is adjacent and adapted to hold the pour spout above the opening within the designated pour opening surface area.

The first fastening device may be configured such to allow the spout to be controlled between a release configuration at which the spout is placeable onto and/or removable from the package and a locking configuration at which the spout is secured to the package. The first fastening device may be configured such to allow the spout to be controlled between the release configuration and the locking configuration by a linear, rotary, tilting, or other combined or more complex movement. The spout may be controllable between the release configuration and the locking configuration by means of a relative movement between at least a portion of the first fastening device and at least a portion of the second fastening device. During the relative movement, the first fastening device and the second fastening device are moving from an unengaged position to an engaged position. In the engaged position, a surface of the first fastening device may be in contact with a surface of the second fastening device. The engagement may create a friction force between the first fastening device and the second fastening device, which is oriented to act against the movement into the unengaged position.

The spout may be placeable onto or removable from the package in linear, rotary, tilting, or other combined or more complex movement suitable to distance the spout from the container and different from the movement of the spout between the release configuration and the locking configuration.

The spout may be controllable between the release configuration and the locking configuration by means of a relative rotation between the spout and the package. In particular, the first fastening device and the second fastening device cooperate such that a relative rotation between the first fastening device and the second fastening device and/or the spout and the package into a first sense of rotation allows to position the spout from the release configuration to the locking configuration and into a second sense of rotation distinct from the first sense of rotation for positioning the spout from the locking configuration to the release configuration and into the locking configuration.

The interaction between the first fastening device and the second fastening device may also be such that a clamping force is exerted on the spout so that a contact surface of the spout is forced against an outer contact surface of the package for forming a sealing assembly. In particular, the contact surface and the outer contact surface face one another and are pressed against one another so that a leakage of the pourable product between the contact surface and the outer contact surface is avoided. This shall guarantee that the pourable product solely exits from a pouring outlet of the spout. Even more particular, the contact surface of the spout is defined by a surface of a portion of the spout having elastic properties.

The first fastening device may comprise one or more fastening members, each one having a respective clamping portion for interposing, in use, at least a respective portion of the spout between the clamping portion and a respective portion of the outer surface of the package, in particular for exerting the clamping force. The fastening members may be arranged adjacent to the pour opening surface area, in particular so that the pour opening surface is interposed between the fastening members. Even more particular, the fastening members may be arranged at opposing sides of the pour opening surface. In particular, such an arrangement allows equilibrating the clamping forces acting on the spout. With the term "equilibrating" is meant that the clamping forces act on two opposing sides of the spout and with the substantially same force.

The clamping portion of the first fastening device may present an extended shape so as to distribute the clamping forces. The clamping portion may present different shapes. E.g. the clamping portion may be arc-shaped or semi-circularly shaped or may have a more or less complex shape.

Each fastening member may comprise a hook element carrying the clamping portion. The hook element may be configured to at least partially extend through a respective groove provided within the spout. Such a configuration may allow a relative rotation of the spout until the hook element abuts with an end section of the groove.

The package may be formed from a multi-layer packaging material having at least a layer of fibrous material. The first fastening device may be molded onto the multi-layer packaging material prior, during or after formation of the package.

The package may be formed from a suitable multi-layer packaging blank.

A sequence of packages may be formed from a suitable multi-layer packaging material, in particular within automatic packaging machines.

The reusable spout for the package filled with a pourable product comprises a second fastening device for interacting with the first fastening device of the package.

The term "second fastening device" as used herein refers to any device that is capable of restraining its relative spatial or rotational movement in at least one degree of freedom when engaged with another device such as the first fastening device. Preferably, the second fastening device is capable of restraining its relative spatial movement in at least one spatial degree of freedom and/or its relative rotational movement in at least one rotational degree of freedom when engaged with another device such as the first fastening device.

In particular, the interaction between the second fastening device and the first fastening device allows a releasable and/or removable engagement of the spout to the package; i,e. the first fastening device and the second fastening device may be brought into engagement with one another and may be disengaged from one another after having been brought into engagement, in particular in a non-destructive manner. The spout may allow a controlled out-pouring of the pourable product filled within the package.

The spout may be a drinking spout so that a consumer could approach the spout to the consumer's mouth. The spout may also be any other kind of spout, as long that it permits the controlled out-pouring of the pourable product.

The spout may be controllable between a release configuration at which the spout is placeable onto and/or removable from the package and a locking configuration at which the spout is secured to the package. The locking configuration guarantees that the spout remains attached to the package during the out-pouring of the pourable product and the release configuration allows to place the spout onto the package prior to its use and the removal of the spout after its use. The spout could be used on the same package repeated times, but could also be used with a new package.

The spout could be controlled the release configuration and the locking configuration by means of a relative movement, in particular a rotation, between at least a portion of the first fastening device and a portion of the second fastening device.

The spout may comprise a pouring outlet and a contact surface opposed to the pouring outlet. With the term "pouring outlet" we intend any outlet, which allows a controlled out-pouring of the pourable product from the package with the spout being attached to the package. The contact surface is a surface of the spout, which is to be brought, in use, into engagement with an outer contact surface of the package so that a sealing assembly is formed in cooperation between the contact surface and the outer contact surface. This shall allow to avoid any leakage of the pourable product. In particular, the formation of the sealing assembly shall guarantee that the pourable product could only exit from the pouring outlet.

The spout may comprise at least an opening member for opening and/or rupturing and/or cutting the designated pour opening surface area. This shall provide the consumer with the possibility to at least partially open the pour opening surface area so that the pourable product can be emptied from the package.

The second fastening device may comprise at least one groove for receiving at least a portion of a fastening member of the first fastening device. In particular, the groove is realized such that the fastening member can at least partially extend through the groove and upon a relative moment between the first fastening device and the second fastening device, the fastening member advances within the groove, in particular until abutting with an end of the groove.

The second fastening device may comprises at least one flap, in particular having an arc-shaped and/or semi-circular shape. The flap may be realized such to be clampable between a portion of the outer surface of the package and a clamping portion of a fastening member of the first fastening device. In particular, the interaction is such to create a clamping force on the spout and to provide for a friction between the flap and the fastening member so as to avoid an unwanted loosening of the spout from the package.

The package and the spout may form a package-spout assembly having the respective package and the respective spout. The package-spout assembly may be defined by the spout being mounted onto the package, but the spout may also be detached from the package.

BEST MODES FOR CARRYING OUT THE INVENTION

Reference numeral 1 indicates as a whole a package-spout assembly having a package 2, in particular a carton package, and a reusable spout 3 removably and/or releasably coupled to or removably and/or releasably couplable to package 2.

Preferably but not necessarily, package 2 is filled with a pourable product, in particular a pourable food product, even more particular a sterilized and/or a sterile-processed pourable food product, such as water, pasteurized milk, fruit juice or other beverages suitable for consumption on-the-go.

Package 2 may be obtained from a web of packaging material having a multilayer structure (not shown), and comprises at least a layer of fibrous material, such as e.g. a paper or cardboard, and at least two layers of polymeric plastic material, e.g. polyethylene, interposing the layer of fibrous material in between one another. One of these two layers of polymeric material defining the inner face of package 2 contacting the pourable product in the filled package 2.

Preferably but not necessarily, the web of packaging material also comprises a layer of gas- and light-barrier material, e.g. aluminum foil or a film layer comprising ethylene vinyl alcohol (EVOH), in particular being arranged between one of the layers of the polymeric material and the layer of fibrous material. Preferentially but not necessarily, the web of packaging material also comprises a further layer of polymeric material being interposed between the layer of gas- and light-barrier material and the layer of fibrous material.

Figure 2:
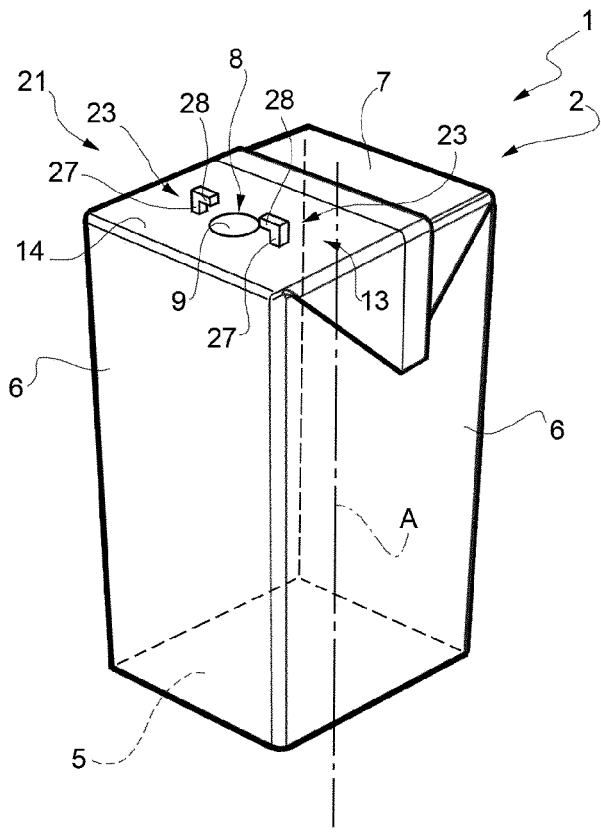
FIG. 2 is a schematic perspective view of the package of FIG. 1, with parts removed for clarity.

With particular reference to FIGS. 1 and 2, package 2 extends along a longitudinal axis A. In particular, package comprises a first wall portion 5, in particular being transversal, even more particular perpendicular, to axis A and, from which package 2 extends along axis A. Preferably but not necessarily, first wall portion 5 defines a support surface of package 2, which is in contact with a support, such as e.g. a shelf, when, in use, being e.g. exposed within a sales point.

Preferably but not necessarily, package 2 also comprises a plurality of lateral walls 6 being (fixedly) connected to first wall portion 5 and extending, in particular substantially parallel to axis A, from first wall portion 5.

Preferably but not necessarily, package 2 also comprises a second wall portion 7 opposite to first wall portion 5 and being (fixedly) connected to lateral walls 6. In other words, lateral walls 6 are interposed between first wall portion 5 and second wall portion 7.

According to the non-limiting example shown in FIGS. 1 and 2, first wall portion 5 and second wall portion 7 may be parallel to one another.

According to a non-limiting alternative embodiment, first wall portion 5 and second wall portion 7 could be inclined with respect to one another.

Preferentially but not necessarily, package 2 is parallel-epiped-shaped.

With particular reference to FIGS. 1 and 2, package 2 comprises a designated pour opening surface area 8. In particular, pour opening surface 8 is configured to be (reversibly or non-reversibly) opened and/or ruptured and/or cut so as to allow the out-pouring of the pourable product from package 2.

Even more particular, pour opening surface area 8 comprises a separation membrane 9 configured to be ruptured and/or opened and/or cut, in particular separating in the area, in particular at, pour opening surface area 8 the inner of package 2 from the outside. Preferably but not necessarily, separation membrane 9 comprises a gas- and light-barrier material, e.g. aluminum foil or a film comprising ethylene vinyl alcohol (EVOH).

According to a preferred non-limiting embodiment, separation membrane 9 is defined by a portion of the web of packaging material, in particular a portion of the layers of the web of packaging material being different from the layer of fibrous material.

Preferentially but not necessarily, pour opening surface area 8 is provided on second wall portion 7.

Advantageously, package 2 comprises at least a first fastening device 13 being coupled to an outer surface 14 of package 2 and being adjacent to pour opening surface area 8. First fastening device 13 is configured to removably and/or reversibly and/or releasably arrange and/or fasten spout 3 to package 2 through cooperation with at least a portion of spout 3 itself.

Figure 4:
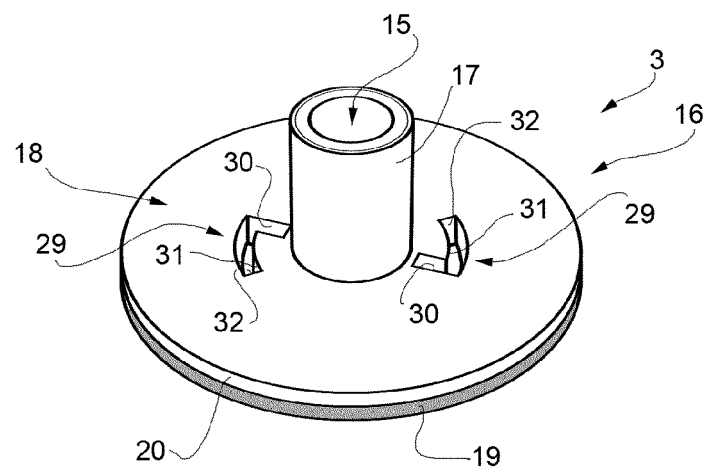
FIG. 4 is a perspective view of the spout of FIG. 1, with parts removed for clarity.
Figure 3:
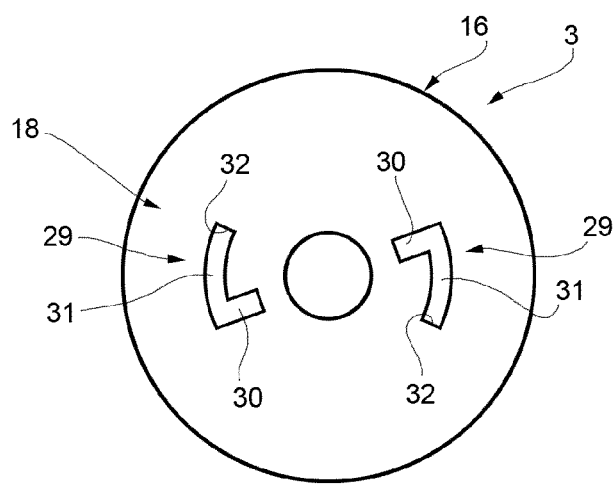
FIG. 3 is a bottom view of the spout of FIG. 1, with parts removed for clarity.

With particular reference to FIGS. 3 and 4, spout 3 comprises a pouring outlet 15 configured to allow the outflow of the pourable product filled into package 2, in particular with spout 3 being placed onto package 2 and pour opening surface area 8 being opened and/or ruptured and/or cut.

Preferentially but not necessarily, spout 3 also comprises a coupling base 16 configured such that at least a portion of coupling base 16 itself contacts, in use, at least a portion of outer surface 14.

According to the non-limiting embodiment shown, coupling base 16 presents a circular cross-section. Alternatively, coupling base 16 could present a different cross-sectional shape, e.g. elliptical or rectangular or quadratic or any other.

According to a preferred non-limiting embodiment, spout 3 also comprises an outlet stub 17 carrying pouring outlet 15 and having an inner flow channel, in particular being configured to, in use, fluidically connect the inner of package 2 with pouring outlet 15, in particular with spout 3 being arranged on package 2 and with pour opening surface area 8 being opened and/or ruptured and/or cut.

Preferentially but not necessarily, outlet stub 17 is coupled to coupling base 16. According to the example shown in FIGS. 1, 3 and 4, outlet stub 17 is fixedly coupled to coupling base 16. In an alternative embodiment not shown, outlet stub 17 could be moveably coupled to coupling base 16; e.g. outlet stub 17 could be hinged to coupling base 16.

Preferentially but not necessarily, spout 3 is also configured to be controlled between an open configuration at which the pourable product can exit from pouring outlet 15 and a closed configured at which the pourable product is hindered from exiting from pouring outlet 15.

According to a preferred non-limiting embodiment not shown, spout 3 could comprise a lid configured to cover pouring outlet 15. In particular, the lid could be configured to control spout 3 between the open configuration and the closed configuration.

In alternative or additionally, outlet stub 17 could be hinged to coupling base 16 and being angularly moveable between at least a first position and at least a second position at which spout 3 is controlled respectively between the open configuration and the closed configuration.

Advantageously, spout 3 comprises a second fastening device 18 configured to releasably and/or removably and/or reversibly engage with first fastening device 13 and/or first fastening device 13 is configured to releasably and/or removably and/or reversibly engage with second fastening device 18 so as to releasably and/or removably and/or reversibly fasten spout 3 to package 2.

In other words, first fastening device 13 and second fastening device 18 are configured to releasably and/or removably and/or reversibly arrange and/or fasten spout 3 to package 2 in collaboration with one another.

In particular, first fastening device 13 is arranged on outer surface 14 such that spout 3 becomes, in use, fastened to package 2 in the area, in particular at, pour opening surface area 8 so that a fluidic connection between the inner of package 2 and pouring outlet 15 establishes or can establish with pour opening surface area 8 being opened and/or ruptured and/or cut. I.e., in use, positioning of spout 3 onto package 2 allows a controlled exit of the pourable product from package 2 through spout 3, in particular pouring outlet 15.

According to a preferred non-limiting embodiment, first fastening device 13 and/or second fastening device 18 is/are configured to allow spout 3 to be controlled between a release configuration at which spout 3 is placeable onto and/or removable from package 2 and a locking configuration at which spout 3 is secured to package 2. I.e., in use, spout 3 being controlled into the locking configuration ensures that spout 3 remains attached to package 2 during the pouring of the pourable product out of package 2 through spout 3. Furthermore, the control of spout 3 into the release configuration allows, in use, the detachment and/or placement of spout 3 from and/or on package 2 so as to be used with the same package 2 again or with a new package 2.

According to a preferred non-limiting embodiment, at least a portion of first fastening device 13 and at least a portion of second fastening device 18 engage with one another and disengage from one another with spout 3 being controlled respectively into the locking configuration and the release configuration.

In more detail, first fastening device 13 and/or second fastening device 18 is/are configured such that spout 3 is controllable between the release configuration and the locking configuration by means of a relative movement, in particular a relative rotation with respect to a rotation axis (parallel to axis A), between (at least a portion of) first fastening device 13 and (at least a portion of) second fastening device 18 and/or between (at least a portion of) package 2 and (at least a portion of) spout 3.

According to a preferred non-limiting embodiment, spout 3 is controllable between the release configuration and the locking configuration in a non-destructive manner; i.e. neither first fastening device 13 nor second fastening device 14 are not subject to any partial destruction.

According to a preferred non-limiting embodiment, first fastening device 13 and/or second fastening device 18 is/are configured such that spout 3 is configured to be controlled from the release configuration into the locking configuration by means of a relative rotation between (at least a portion of) package 2 and (at least a portion of) spout 3 around the rotation axis into a first sense of rotation and from the locking configuration into the release configuration by means of a relative rotation into a second sense of rotation distinct from the first sense of rotation.

Preferably but not necessarily, first fastening device 13 and/or second fastening device 18 is/are configured such to interact with one another so as to exert a clamping force on spout 3 in a manner that a contact surface of spout 3 is, in use, forced against an outer contact surface of outer surface 14, in particular for forming a sealing assembly. In particular, the formation of the sealing assembly allows limiting the risk of a leakage of the pourable product between spout 3 and package 2.

More specifically, the clamping force is such that spout 3, in particular the contact surface, is pressed onto package 2, in particular the outer contact surface.

In more detail, the outer contact surface is positioned adjacent to, in particular surrounds, pour opening surface area 8.

According to a preferred non-limiting embodiment, spout 3, in particular coupling base 16, comprises a sealing layer carrying the contact surface. Preferentially but not necessarily, sealing layer 19 is at least partially, preferably is fully, realized from an elastic material.

Preferably but not necessarily, spout 3, in particular coupling base 16, comprises a support layer 20 carrying outlet stub 17. In particular, support layer 20 and sealing layer 19 contact one another. In use, with spout 3 being arranged on package 2, sealing layer 19 is interposed between support layer 20 and outer surface 14, in particular the outer contact surface.

According to a preferred non-limiting embodiment, first fastening device 13 comprises at least one fastening member 21, two in the example shown in FIGS. 1 and 2, each one having a respective clamping portion 22 being configured to interpose at least a portion of spout 3, in particular coupling base 16, between the respective clamping portion 22 and a portion of outer surface 14, in particular a portion of the outer contact surface, at least with spout 3 being, in use, controlled into the locking configuration.

Preferably but not necessarily, each clamping portion 22 extends substantially parallel to pour opening surface area 8.

According to the non-limiting embodiment shown in FIGS. 1 and 2, first fastening device 13 comprises at least two fastening members 21 interposing at least a portion of pour opening surface area 8 in between one another.

According to the non-limiting embodiment shown in FIGS. 1 and 2, each fastening member 21 comprises a hook element 23 carrying the respective clamping portion 22.

In more detail, each hook element 23 comprises:
a first section 27 being coupled to and/or contacting outer surface 14 and extending transversally, in particular perpendicularly from outer surface 14; and
a second section 28 being connected to and protruding transversally away from first section 27, in particular second section 28 being substantially parallel to pour opening surface area 8.

Preferably but not necessarily, second section 28 carries clamping portion 22 and/or defines clamping portion 22.

According to a preferred non-limiting embodiment, first fastening device 13, in particular each fastening member 21, even more particular each hook element 23, is applied onto outer surface 14 by means of a molding process.

Preferably but not necessarily, first fastening device 13, in particular each fastening member 21, even more particular each hook element 23, is applied onto an external layer of the web of packaging material and/or an at least partially formed package 2.

With particular reference to FIGS. 3 and 4, second fastening device 18 comprises at least one fastening element, in particular one groove 29, in the example shown two, configured to interact and/or cooperate with one respective fastening member 21. In particular, groove 29 is provided within spout 3, even more particular within coupling base 16. More specifically, each groove 29 is configured to cooperate and/or interact with one respective hook element 23.

Preferably but not necessarily, each hook element 23 and/or each groove 29 is formed such that, in use, each hook element 23 is adapted to extend at least partially through one respective groove 29.

According to the non-limiting embodiment shown, each groove 29 comprises a receiving portion 30 and a guiding portion 31, in particular being connected to one another.

More specifically, receiving portion 30 is configured to receive the respective hook element 23 with spout 3 being controlled into the release configuration and guiding portion 31 is configured to guide the relative movement between package 2 and spout 3 during control of spout 3 from the release configuration to the locking configuration and/or from the locking configuration to the release configuration.

According to the non-limiting embodiment shown, each groove 29 is a through-groove extending through coupling base 16, in particular both sealing layer 19 and support layer 20.

In an alternative embodiment not shown, each groove 29 could extend solely through a portion of coupling base 15. In particular, a respective zone of each guiding section 31 would be delimited by at least three inner walls.

With particular reference to FIGS. 3 and 4, each guiding section 31 presents an arc-shaped and/or semi-circular form.

According to a preferred non-limiting embodiment, first fastening device 13 and/or second fastening device 14 comprises at least one abutment element 32 configured to limit the possible relative movement, in particular the relative rotation, between first fastening device 13 and second fastening device 14 and/or package 2 and spout 3. In particular, abutment element 32 is configured to define and/or determine the locking configuration of spout 3.

Preferably but not necessarily, abutment element 32 is configured to contact respectively a portion of the second fastening device 18 and/or a portion of the first fastening device 13 at least with spout 3 being controlled into the locking configuration.

With particular reference to the embodiment disclosed in FIGS. 1 to 4, second fastening device 18 comprises abutment element 32, in particular a plurality of abutment elements 32, two in the example shown.

In particular, each groove 29 comprises one respective abutment element 32.

Preferably but not necessarily, each abutment element 32 is defined by an end portion of the respective guiding section 31, in particular the end portion of guiding section 31 being opposed to receiving section 30.

More specifically, each hook element 23 is configured to contact one respective abutment element 32 with spout 3 being controlled into the locking configuration.

Preferentially but not necessarily, each abutment element 32 is configured to limit the course of the respective hook element 23 within groove during a relative rotation of first fastening device 13 and second fastening device 14 and/or of package 2 and spout 3 with respect to one another into the first sense of rotation.

According to a preferred non-limiting embodiment, spout 3 also comprises an opening member, in particular a cutter, configured to open and/or rupture and/or cut at least partially pour opening surface area 8, in particular separation membrane 9.

According to a non-limiting embodiment not shown, the opening member could be fixedly connected to and protruding from coupling base 16. In particular, the opening member could be configured such to at least partially penetrate into package 2 with spout 3 being arranged onto package 2, in particular with spout 3 being controlled into the locking configuration.

It should be mentioned that package 2 is produced on automatic packaging machines (known as such and not further described) from the web of packaging material. In particular, the web of packaging material comprises a sequence of a repetitive pattern defining a plurality of multi-layer packaging blanks.

According to a preferred non-limiting embodiment, each multi-layer packaging blank is configured to allow the formation of a respective package 2 having first fastening device 13.

According to a non-limiting embodiment, each multi-layer packaging blank comprises first fastening device 13; i.e. first fastening device 13 is attached prior to the introduction of the web of packaging material into the packaging machine.

According to a preferred alternative non-limiting embodiment, first fastening device 13 is applied onto the respective multi-layer packaging blank and/or the at least partially formed package 2 within the packaging machine.

According to a preferred non-limiting embodiment, the packaging machine itself and/or a separate packaging unit is configured to create multi-packs comprising a plurality of packages 2 and one respective spout 3 configured to be used consecutively with each package 2 of the respective multi-pack.

Alternatively and/or in addition, each spout 3 can be provided separately from packages 2 and/or multi-packs of package 2.

In use, a consumer attaches spout 3 to package 2 in the area of, in particular at, pour opening surface area 8. In particular, the consumer executes a relative movement, in particular a relative rotation, between the respective package 2 and spout 3, so as to control spout 3 into the locking configuration, in particular by a relative rotation into the first sense of rotation.

More specifically, the consumer guides at least partially each respective hook element 23 through the respective groove 29, in particular the respective receiving section 30 and by executing the relative movement (into the first sense of rotation) and the interaction between each hook element 23 and the respective groove 29, in particular the respective guiding section 31, spout 3 is controlled into the locking configuration. In particular, spout 3 is in its locking configuration with each hook element 23 contacting the respective abutment element 32.

The opening member of spout 3 opens and/or ruptures and/or cuts pour opening surface area 8, in particular separating membrane 9.

After use, the consumer controls spout 3 into the release configuration, in particular by a relative rotation into the second sense of rotation, and removes spout 3 from package 2. Spout 3 can then be newly used with another package 2, in particular after a cleaning of spout 3.

Figure 5:
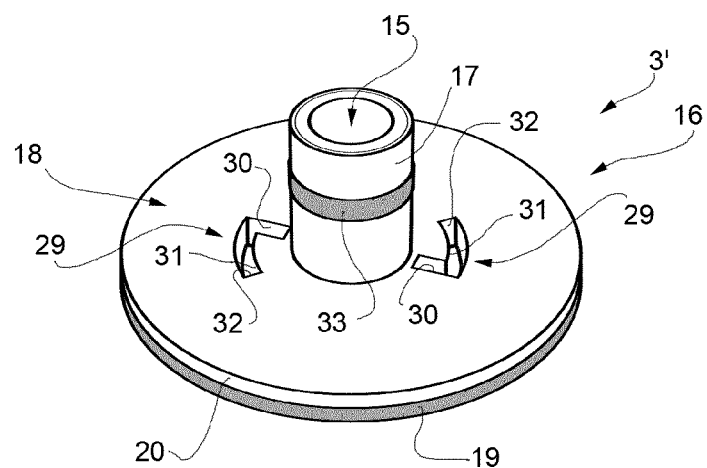
FIG. 5 is a perspective view of a spout of the present invention according to an alternative embodiment, with parts removed for clarity.

With reference to FIG. 5, number 3' indicates an alternative embodiment of a spout according to the present invention; as spout 3' is similar to spout 3, the following description is limited to the differences between them, and using the same references, where possible, for identical or corresponding parts.

Spout 3' differs from spout 3 in that the opening member is moveable at least between a rest position and an opening position and in comprising a control member 33 configured to control and/or move the opening member between the rest position and the opening position.

In particular, the opening member is configured to open and/or rupture and/or cut at least a portion of pour opening surface area 8, in particular separating member 9, with spout 3' being placed on package 2 and with the opening member being controlled into the open position.

In use, the opening member can be controlled into the opening position prior, during or after application of spout 3' onto package 2. In particular, it is possible to execute the opening and/or rupturing and/or cutting of the portion of pour opening surface area 8, in particular separating member 9, also after application of spout 3' so that the application of spout 3' onto package 2 and the loosening of the integrity of pour opening surface area 8 can be temporarily detached.

Figure 6:
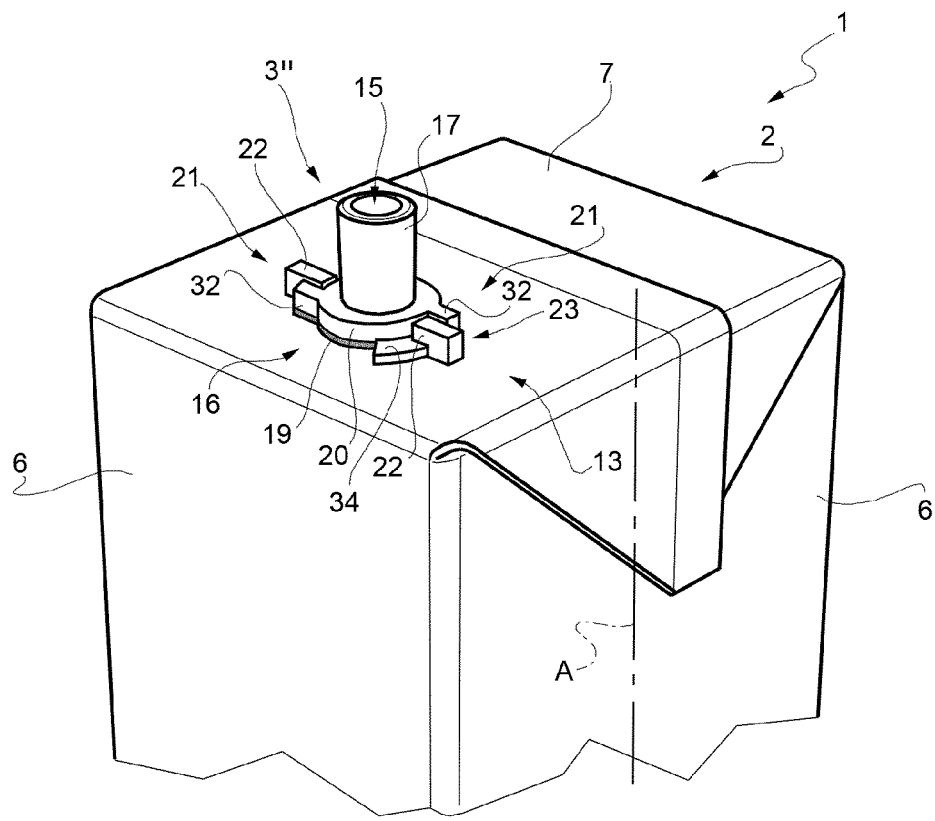
FIG. 6 is a perspective view of a package-spout assembly having a package and a spout according to alternative embodiments of a package and a spout according to the present invention, with parts removed for clarity.

With reference to FIG. 6, number 3" indicates an alternative embodiment of a spout according to the present invention attached to package 2; as spout 3" is similar to spout 3, the following description is limited to the differences between them, and using the same references, where possible, for identical or corresponding parts.

Spout 3" differs from spout 3 in that the respective second fastening device 18 comprises at least one flap 34, preferentially a plurality of flaps 34, in the example shown two. In particular, each flap 34 defines a respective fastening element of second fastening device 18.

Preferentially but not necessarily, each flap 34 is coupled and/or connected to coupling base 16. In particular, each flap 34 protrudes radially away from coupling base 16.

Alternatively, each flap 34 could extend within a space provided within sealing layer 19, in particular being connected to support layer 20.

Preferentially but not necessarily, each flap 34 is configured to enter a clamping space defined between the respective clamping portion 22 of one respective fastening member 21 and a portion of outer surface 14. In particular, each flap 34 comprises a respective engagement surface configured to contact, in use, the respective clamping portion 22, in particular a respective interaction surface of the clamping portion 22. Even more particular, in use, during control of spout 3" between the release configuration and the locking configuration, movement of spout 3" is defined and/or delimited by the respective engagement surface and the respective interaction surface.

More specifically, in use, each engagement surface slides along the respective interaction surface during control of spout 3" between the release configuration and the locking configuration.

According to a preferred non-limiting embodiment, each flap 34 presents an arc-shaped and/or semi-circular form.

Preferentially but not necessarily, second fastening device 18 comprises at least one, preferably a plurality of abutment elements 32, even more preferably a number of abutment elements 32 identical to the number of flaps 34.

According to a preferred non-limiting embodiment, each fastening member 21, in particular the respective hook element 23, gets into contact with one respective abutment element 32 with spout 3" being controlled into the locking configuration.

Preferentially but not necessarily, each flap 34 also carries and/or is connected with one respective abutment element 32. Preferably, each abutment element 32 is connected to, in particular extends transversally from, a respective end portion of the respective flap 34.

In particular, each abutment element 32 is configured to delimit the relative movement of first fastening device 13 and second fastening device 14 and/or spout 3" and package 2 with respect to one another.

Preferentially but not necessarily, each abutment element 32 is arranged such that spout 3" is controllable from the release configuration to the locking configuration and vice-versa by means of the relative rotation of first fastening device 13 and second fastening device 14 and/or of spout 3" and package 2 into respectively the first sense of rotation and the second sense of rotation.

It must be understood that in a similar manner to spout 3', spout 3" could comprise an opening member moveable between a rest position and an opening position and comprising a control member for controlling the opening member between the rest position and the opening position.

Figure 7:
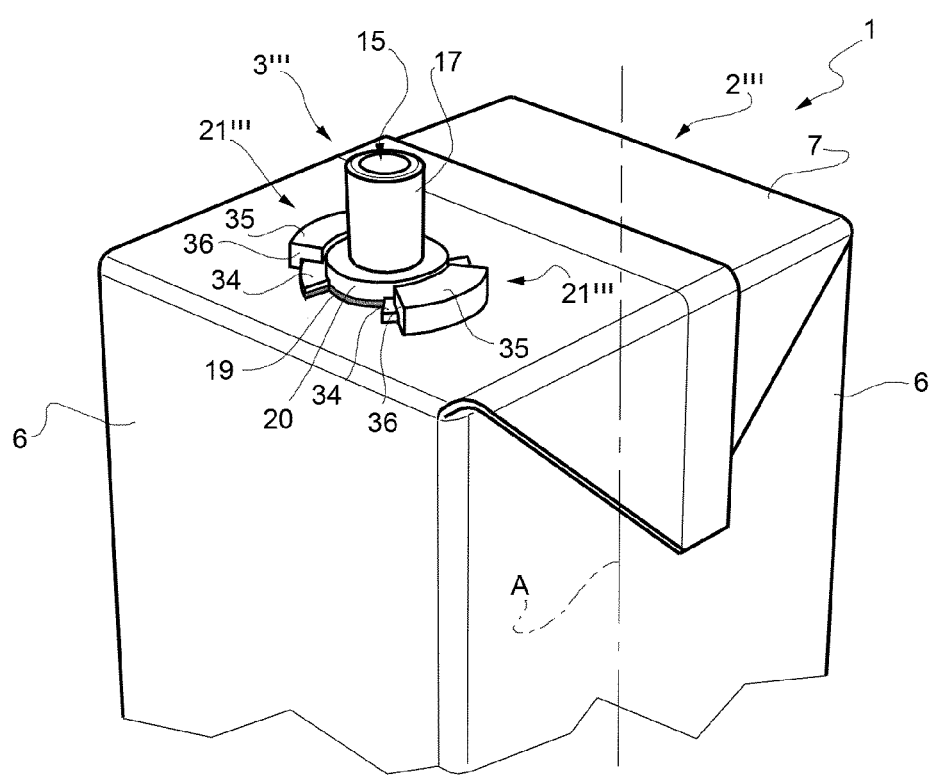
FIG. 7 is a perspective view of a package-spout assembly having a package and a spout according a further alternative embodiments of a package and a spout according to the present invention, with parts removed for clarity.

With reference to FIG. 7, number 3'" indicates an alternative embodiment of a spout according to the present invention and number 2'" indicates an alternative embodiment of a package according to the present invention; as spout 3'" is similar to spout 3" and as package 2'" is similar to package 2, the following description is limited to the differences between respectively spout 3'" and spout 3" and package 2'" and package 2, and using the same references, where possible, for identical or corresponding parts.

In particular, spout 3'" differs from spout 3" in that second fastening device 18 does not comprise an abutment element. I.e. there is no abutment element connected to flaps 34.

In particular, package 2'" differs from package 2 in that first fastening device 13 comprises at least one fastening member 21'", in particular a plurality of fastening members 21'", in the specific example shown two.

Each fastening member 21'" comprises a collar 35 having or defining the respective clamping portion 22. In particular, each collar 35 defines and/or at least partially delimits in cooperation with a portion of outer surface 14 a clamping space. In particular, in use, one respective flap 34 enters into and/or advances within one respective clamping space, in particular so as to control spout 3'" between the release configuration and the locking configuration.

Preferentially but not necessarily, each collar 35 comprises an interaction surface, in particular facing outer surface 14, configured to interact with an engagement surface of one respective flap 34. In use, each engagement surface slides along one respective interaction surface during control of spout 3'" between the release configuration and the locking configuration.

According to a preferred non-limiting embodiment, each interaction surface and the respective engagement surface are inclined with respect to one another.

Preferentially but not necessarily, collars 35 face one another.

Preferentially but not necessarily, each collar 35 presents an arc-shaped and/or semi-circular form.

According to a preferred non-limiting embodiment, each fastening member 21'" also comprises a support base 36 contacting outer surface 14 and carrying collar 35, in particular collar 35 protruding transversally from support base 36.

According to the preferred non-limiting embodiment shown in FIG. 7, the respective end portions of each fastening member 21'" are open; i.e. each flap 21'" can, in use, enter and exit the respective clamping space from both end portions. In use, spout 3'" can be controlled from the release configuration to the locking configuration and vice-versa independently of the sense of the relative rotation between first fastening device 13 and second fastening device 14 and/or spout 3'" and package 2'".

According to a preferred non-limiting alternative not shown, first fastening device 13 also comprises at least one abutment element, preferentially a plurality of abutment elements, even more preferentially a number of abutment elements identical to the number of fastening members 21'".

Preferentially but not necessarily, each abutment element is associated to one respective fastening member 21'". In particular, each abutment element is arranged (on outer surface 14 and) adjacent to a first end portion of the respective fastening member 21'", in particular the respective collar 35. Even more particular, each abutment element further delimits the respective clamping space.

Preferentially but not necessarily, each abutment element is connected to one respective fastening member 21'" at the first end portion.

In particular, a second end portion of each fastening member 21'" opposed to the respective first end portion allows the entrance of the respective flap 34 into the clamping space.

Preferentially but not necessarily, with spout 3'" being controlled in the locking configuration each flap 34 contacts one respective abutment element. In use, spout 3'" can be controlled from the respective release configuration to the respective locking configuration by means of rotation into the first sense of rotation and from the respective locking configuration to the respective release configuration by means of rotation into the second sense of rotation distinct from the first sense of rotation. In particular, during control of spout 3''' from the respective release configuration to the respective locking configuration each flap 34 advances within the respective clamping space until each flap 34 gets into contact with the respective abutment element. Even more particular, at some relative angular position of spout 3''' the possible rotation of spout 3''' into the first sense of rotation is blocked by the interaction of each flap 34 with the respective abutment element. Control of spout 3''' from the respective locking configuration to the respective release configuration requires to rotate spout 3''' into the second sense of rotation so as to remove each flap 34 from its respective clamping space.

It should be noted that spout 3'' could also be arranged on package 2'''; i.e. second fastening device 18 of spout 3'' could interact with first fastening device 13 of package 2'''.

It should also be noted that spout 3''', in a manner similar to spout 3'', could comprise an opening member being controllable between a rest position and an opening position and comprising a control member for controlling the opening member between the rest position and the opening position.

The advantages of packages 2 and 2''' and/or of spout 3, 3', 3'' and 3''' according to the present invention will be clear from the foregoing description.

In particular, it is possible to use a spout 3, 3', 3'' and 3''', which can be removably and/or releasably arranged on a package 2 or 2''' and thus, spout 3, 3', 3'' and 3''' can be used repeatedly with different packages 2 or 2'''. Accordingly, it is possible to renounce to use one-way drinking straws packaged within an envelope.

It is a further advantage that spouts 3, 3', 3'' and 3''' can be provided together with a multi-package of packages 2 and 2''' or spouts 3, 3', 3'' and 3''' can be distributed separately from packages 2 and 2'''.

It is another advantage that spout 3, 3', 3'' and 3''' can be cleaned after its use.

An even further advantage is that spout 3, 3', 3'' and 3''' can be secured onto packages 2 and 2''' so as to avoid any unwanted loosening of spout 3, 3', 3'' ad 3''' from packages 2 and 2'''.

Clearly, changes may be made to package 2 and 2''' and/or spout 3, 3', 3'', 3''' as described herein without, however, departing from the scope of protection as defined in the accompanying claims.

It should be noted that the specific embodiment disclosed regards a pourable food product. However, any other kind of pourable product could be used, such as e.g. detergent or similar. Accordingly, the respective spout to be placed on packages 2 and 2''' is not a drinking spout, but a pouring spout, in particular adapted to allow dosing of the pourable product.

The invention claimed is:

1. Package for a pourable product comprising:
    a designated pour opening surface area comprising a rupturable and/or openable and/or cuttable separation membrane;
    at least a first fastening device coupled to an outer surface of the package and adjacent to the designated pour opening surface area;
    wherein the first fastening device is configured to releasably and/or removably fasten a spout to the package by releasably and/or removably engaging with a second fastening device of the spout;
    wherein the first fastening device comprises at least one fastening member having a clamping portion configured to interpose at least a portion of the second fastening device between the clamping portion and an outer contact surface of the outer surface of the package so as to exert a clamping force on the second fastening device in a manner that a contact surface of the second fastening device is, in use, forced against the outer contact surface of the outer surface of the package for forming a sealing assembly.

2. Package according to claim 1, wherein the first fastening device is configured such to allow the spout to be controlled between a release configuration at which the spout is placeable onto and/or removable from the package and a locking configuration at which the spout is secured to the package;
    wherein the first fastening device is configured such that the spout is controllable between the release configuration and the locking configuration by means of a relative movement between at least a portion of the first fastening device and at least a portion of the second fastening device.

3. The package according to claim 2, wherein the first fastening device is configured to cooperate with the second fastening device such that the spout is controllable from the release configuration and into the locking configuration by means of a relative rotation between at least a portion of the spout and at least a portion of the package into a first sense of rotation and from the locking configuration to the release configuration by means of a relative rotation into a second sense of rotation distinct from the first sense of rotation.

4. Package according to claim 1, wherein the first fastening device comprises at least two fastening members, each one having one respective clamping portion, and being arranged such to interpose the designated pour opening surface area between one another.

5. Package according to claim 1, wherein the clamping portion is arc-shaped and/or semi-circularly shaped.

6. Package according to claim 1, wherein the fastening member comprises a hook element carrying the clamping portion;
    wherein the second fastening device comprises at least one groove provided within the spout;
    wherein the hook element is configured such to be able to extend at least partially through the groove.

7. Package according to claim 6, wherein the hook element is also configured to allow, when in use at least partially extending through the groove, for a relative movement between the hook element itself and the groove.

8. Package according to claim 1, wherein the package is formed from a multi-layer packaging material having at least a layer of fibrous material and wherein the first fastening device is molded onto the multi-layer packaging material prior, during or after formation of the package.

9. A multi-layer packaging blank for folding a package according to claim 1.

10. A multi-layer packaging material for forming a sequence of packages according to claim 1.

11. Package-spout assembly comprising at least a package according to claim 1 and a reusable spout that comprises at least a second fastening device configured to releasably and/or removably engage with the first fastening device so as to releasably and/or removably fasten the spout to the package.

12. Reusable spout for a package filled with a pourable product;
    the package having a designated pour opening surface area comprising a rupturable and/or openable and/or cuttable separation membrane, and at least a first fastening device being coupled to an outer surface of the package and adjacent to the designated pour opening surface area and the first fastening device comprises at least one fastening member having a clamping portion being configured to interpose at least a portion of the spout between the clamping portion and an outer contact surface of the outer surface of the package;

wherein the reusable spout comprises at least a second fastening device configured to releasably and/or removably engage with the first fastening device so as to releasably and/or removably fasten the spout to the package;

wherein the spout comprises a pouring outlet and a contact surface opposed to the pouring outlet and the contact surface being configured to engage onto the outer contact surface of the outer surface of the package and to form a sealing assembly in cooperation with the outer contact surface; and wherein the second fastening device comprises at least one flap configured to be clamped between the outer contact surface of the outer surface and the clamping portion.

13. Spout according to claim 12, wherein the second fastening device is configured to allow the spout to be controlled between a release configuration at which the spout is placeable onto and/or removable from the package and a locking configuration at which the spout is secured to the package;

wherein the second fastening device is configured such that the spout is controllable between the release configuration and the locking configuration by means of a relative movement, in particular a rotation, between at least a portion of the first fastening device and at least a portion of the second fastening device.

14. Spout according to claim 12, wherein the spout comprises at least an opening member configured to open and/or rupture and/or cut the designated pour opening surface area.

15. Spout according to claim 12, wherein the second fastening device comprises at least one groove configured to receive at least a portion of a fastening member of the first fastening device.

16. Spout according to claim 12, wherein the at least one flap is arc-shaped and/or semi-circularly shaped.

* * * * *